US010239421B2

(12) United States Patent
Katoh et al.

(10) Patent No.: US 10,239,421 B2
(45) Date of Patent: Mar. 26, 2019

(54) VEHICLE SEAT

(71) Applicant: TOYOTA JIDOSHA KABUSHIKI KAISHA, Toyota-shi, Aichi-ken (JP)

(72) Inventors: Kohshi Katoh, Hadano (JP); Carlos David Gonzalez Uribe, Iwata (JP); Yasuhiro Suwa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/703,156

(22) Filed: Sep. 13, 2017

(65) Prior Publication Data

US 2018/0072187 A1 Mar. 15, 2018

(30) Foreign Application Priority Data

Sep. 15, 2016 (JP) ................. 2016-180485

(51) Int. Cl.
| | |
|---|---|
| *B60N 2/54* | (2006.01) |
| *B60N 2/02* | (2006.01) |
| *B60N 2/20* | (2006.01) |
| *B60N 2/68* | (2006.01) |
| *B60N 2/70* | (2006.01) |
| *B60N 2/72* | (2006.01) |
| *B60N 2/39* | (2006.01) |

(52) U.S. Cl.
CPC .......... *B60N 2/028* (2013.01); *B60N 2/0284* (2013.01); *B60N 2/20* (2013.01); *B60N 2/39* (2013.01); *B60N 2/682* (2013.01); *B60N 2/686* (2013.01); *B60N 2/7076* (2013.01); *B60N 2/7094* (2013.01); *B60N 2/72* (2013.01); *B60N 2002/0208* (2013.01); *B60N 2002/0212* (2013.01)

(58) Field of Classification Search
CPC ........ B60N 2/028; B60N 2/0284; B60N 2/20; B60N 2/682; B60N 2/686; B60N 2/7094; B60N 2/72; B60N 2/7076; B60N 2/39; B60N 2002/0208; B60N 2002/0212
USPC .............. 297/216.1, 216.12, 216.13, 216.14, 297/216.15, 216.16, 216.17, 216.18, 297/216.19, 216.2, 452.18, 452.2, 452.33, 297/452.34, 452.35, 452.36, 452.56
See application file for complete search history.

(56) References Cited

U.S. PATENT DOCUMENTS

| | | | | |
|---|---|---|---|---|
| 4,183,582 A | * | 1/1980 | Taki ..................... | B60N 2/4221 297/216.13 X |
| 4,580,840 A | * | 4/1986 | Cunningham ....... | B60N 2/7011 297/452.18 |
| 4,834,322 A | * | 5/1989 | Wurst .................... | B64D 25/04 297/216.1 X |

(Continued)

FOREIGN PATENT DOCUMENTS

| | | |
|---|---|---|
| JP | 2016-005938 A | 1/2016 |
| WO | 2013-021497 A1 | 2/2013 |

*Primary Examiner* — Rodney B White
(74) *Attorney, Agent, or Firm* — Hunton Andrews Kurth LLP

(57) ABSTRACT

A vehicle seat in which a swiveling motion of a sub-frame is restricted only to a desirable direction is provided. A sub-frame is suspended from a seatback frame. A first elastic member connects a right upper end of the sub-frame to the seat back frame, and a second elastic member a left upper end of the sub-frame to the seat back frame. A universal joint mechanism connects a lower lateral portion of the sub-frame to a lateral member of the seat back frame.

6 Claims, 9 Drawing Sheets

(56) References Cited

U.S. PATENT DOCUMENTS

| | | | | |
|---|---|---|---|---|
| 6,435,618 B1* | 8/2002 | Kawasaki | A47O 7/28 | |
| | | | 297/452.56 | |
| 6,619,751 B1* | 9/2003 | Shah | A42B 3/0473 | |
| | | | 297/216.12 X | |
| 6,709,062 B2* | 3/2004 | Shah | A42B 3/0473 | |
| | | | 297/216.12 X | |
| 6,921,132 B2* | 7/2005 | Fujita | B60N 2/42709 | |
| | | | 297/452.56 X | |
| 7,077,478 B2* | 7/2006 | Nakamura | B60N 2/68 | |
| | | | 297/452.56 X | |
| 7,090,300 B2* | 8/2006 | Fujita | B60N 2/7058 | |
| | | | 297/452.56 X | |
| 7,134,718 B2* | 11/2006 | Yasuda | B60N 2/4228 | |
| | | | 297/452.56 X | |
| 7,275,793 B2* | 10/2007 | Fujita | A47O 31/006 | |
| | | | 297/452.56 X | |
| 7,290,837 B2* | 11/2007 | Sugiyama | B60N 2/66 | |
| | | | 297/452.33 X | |
| 7,416,256 B2* | 8/2008 | Fujita | B60N 2/502 | |
| | | | 297/452.56 X | |
| 7,481,493 B2* | 1/2009 | Fujita | A47O 7/28 | |
| | | | 297/452.56 X | |
| 7,503,627 B2* | 3/2009 | Kawasaki | A47O 7/022 | |
| | | | 297/452.56 X | |
| 7,618,096 B2* | 11/2009 | Fujita | B60N 2/7094 | |
| | | | 297/452.56 | |
| 7,731,294 B2* | 6/2010 | Yasuda | B60N 2/58 | |
| | | | 297/452.56 X | |
| 7,845,733 B2* | 12/2010 | Fujita | B60N 2/42709 | |
| | | | 297/452.56 X | |
| 7,971,939 B2* | 7/2011 | Fujita | B60N 2/70 | |
| | | | 297/452.56 | |
| 8,590,979 B2* | 11/2013 | Matsumoto | B60N 2/4228 | |
| | | | 297/452.56 X | |
| 8,696,066 B2* | 4/2014 | Mizobata | B60N 2/682 | |
| | | | 297/452.56 X | |
| 8,857,908 B2* | 10/2014 | Brncick | B60N 2/0232 | |
| | | | 297/452.56 X | |
| 8,936,317 B2* | 1/2015 | Yamaguchi | B60N 2/4228 | |
| | | | 297/452.36 X | |
| 9,873,364 B2* | 1/2018 | Hamabe | B60N 2/7094 | |
| 2002/0060493 A1* | 5/2002 | Nishino | B60N 2/58 | |
| | | | 297/452.56 | |
| 2002/0096932 A1* | 7/2002 | Fujita | B60N 2/58 | |
| | | | 297/452.56 | |
| 2002/0135218 A1* | 9/2002 | Fujita | B60N 2/5891 | |
| | | | 297/452.56 | |
| 2003/0006640 A1* | 1/2003 | Yasuda | A47O 1/02 | |
| | | | 297/452.56 | |
| 2004/0256903 A1* | 12/2004 | Fujita | B60N 2/7035 | |
| | | | 297/452.48 | |
| 2008/0079307 A1* | 4/2008 | Su | A47O 7/282 | |
| | | | 297/452.56 | |
| 2010/0259089 A1* | 10/2010 | Mizobata | B60N 2/7011 | |
| | | | 297/452.56 | |
| 2012/0267939 A1* | 10/2012 | Ota | B60N 2/7011 | |
| | | | 297/452.56 | |
| 2014/0191550 A1 | 7/2014 | Katoh, et al. | | |
| 2015/0165949 A1* | 6/2015 | Tobata | B60N 2/16 | |
| | | | 297/452.34 X | |
| 2015/0367756 A1 | 12/2015 | Katoh, et al. | | |
| 2017/0267145 A1* | 9/2017 | Gonzalez Uribe | B60N 2/643 | |
| 2018/0022238 A1* | 1/2018 | Gonzalez Uribe | B60N 2/66 | |

* cited by examiner

VEHICLE SEAT

CROSS REFERENCE TO RELATED APPLICATIONS

The present application claims the benefit of priority to Japanese Patent Application No. 2016-180485 filed on Sep. 15, 2016 with the Japanese Patent Office.

BACKGROUND

Field of the Disclosure

Embodiments of the present disclosure relate to a vehicle seat in which a seatback is partially allowed to swivel in accordance with a twisting motion of the occupant during turning of a vehicle.

Discussion of the Related Art

One example of the vehicle seat of this kind in which a backrest section is allowed to swivel with respect to a seatback frame is described in US2015/0367756 A1.

According to the teachings of US2015/0367756 A1, the backrest section is suspended from an upper portion of the seatback frame through a suspension section including a vertical-cord portion and a cross-cord portion. The vertical-cord portion and the cross-cord portion are configured by flexible and extendible/contractible linear shaped members. An outer periphery support section of the backrest is connected to the seatback frame through longitudinal wires at each width end portion and a width center of a lower end portion. In the vehicle seat taught by US2015/0367756 A1, therefore, the backrest section is allowed to swivel within flexibilities of the longitudinal wires around a swivel center situated at a level of thoracic vertebra of an occupant.

PCT international publication WO 2013/021497 also describes the vehicle seat in which a backrest is attached to the seat frame is allowed to rotate in the roll direction.

According to the teachings of US2015/0367756 A1, the backrest section may be allowed to swivel by the above-explained simple structure. In the vehicle seat taught by US2015/0367756 A1, however, the backrest section is allowed to swivel not only in the width direction but also in other directions with respect to the seatback frame. That is, in the vehicle seat taught by US2015/0367756 A1, the backrest section may be moved unnecessarily in an undesirable direction by any motion of the occupant.

SUMMARY

Aspects of the present disclosure have been conceived noting the foregoing technical problems, and it is therefore an object of the present disclosure is to provide a vehicle seat in which a swiveling motion of a sub-frame is restricted only to a desirable direction.

Embodiments of the present disclosure relates to a vehicle seat comprising a main frame including a seatback frame contoured along a back of an occupant, and a sub-frame suspended from a front face of the seat back frame. The sub-frame includes a right longitudinal portion, a left longitudinal portion, and a lower lateral portion extending between the right longitudinal portion and the left longitudinal portion. In order to achieve the above-explained objective, according to the embodiments of the present disclosure, the vehicle seat is provided with: a first elastic member that connects a right upper end of the right longitudinal portion of the sub-frame of the seat back frame; a second elastic member that connects a left upper end of the left longitudinal portion of the sub-frame to the seat back frame; and a universal joint mechanism that connects the lower lateral portion of the sub-frame to a lateral member of the seat back frame. The first elastic member and the second elastic member are adapted to be elastically bent by a motion of the occupant to allow the sub-frame to swivel. The universal joint mechanism is adapted to allow the sub-frame to swivel while receiving a load applied to the sub-frame in an anteroposterior direction.

In a non-limiting embodiment the first elastic member and the second elastic member may include a blade spring. The first elastic member and the second elastic member may be inclined symmetrically in such a manner that a distance between an inner major face of the first elastic member and an inner major face of the second elastic member is increased toward the lower side.

In a non-limiting embodiment, the universal joint mechanism may include a first joint attached to the lower lateral portion of the sub-frame, a second joint attached to the lateral member of the seat back frame, and an arm extending in the anteroposterior direction between the first joint and the second joint.

In a non-limiting embodiment, the first joint and the second joint may include a ball joint.

Thus, according to the embodiments of the present disclosure, the sub-frame is attached to the seatback frame of the main frame through the first elastic member, the second elastic member and the universal joint mechanism. Specifically, the first elastic member and the second elastic member connect the upper end portions of the U-shaped sub-frame to the seatback frame in such a manner as to allow a swiveling motion of the sub-frame while restricting a swiveling range of the sub-frame. In addition, the universal joint mechanism connects the lower lateral portion of the sub-frame to the lateral member of the seat back frame in such a manner as to allow the sub-frame to swivel within a predetermined range while restricting a swiveling direction of the sub-frame only in a width direction of the vehicle seat. According to the embodiments of the present disclosure, therefore, the swiveling range and the swiveling direction of the sub-frame may be restricted to a desirable range and direction by the simple devices.

Specifically, the swiveling range and the swiveling direction of the sub-frame may be adjusted by altering inclinations, length, materials etc. of the first elastic member and the second elastic member.

In addition, since the blade springs are used as the first elastic member and the second elastic member, the sub-frame 16 may be returned automatically to an original center position by reaction forces of the first elastic member and the second elastic member.

BRIEF DESCRIPTION OF THE DRAWINGS

Features, aspects, and advantages of exemplary embodiments of the present disclosure will become understood with reference to the following description and accompanying drawings, which do not limit the disclosure in any way.

DETAILED DESCRIPTION OF SOME EMBODIMENTS

Figure 1:
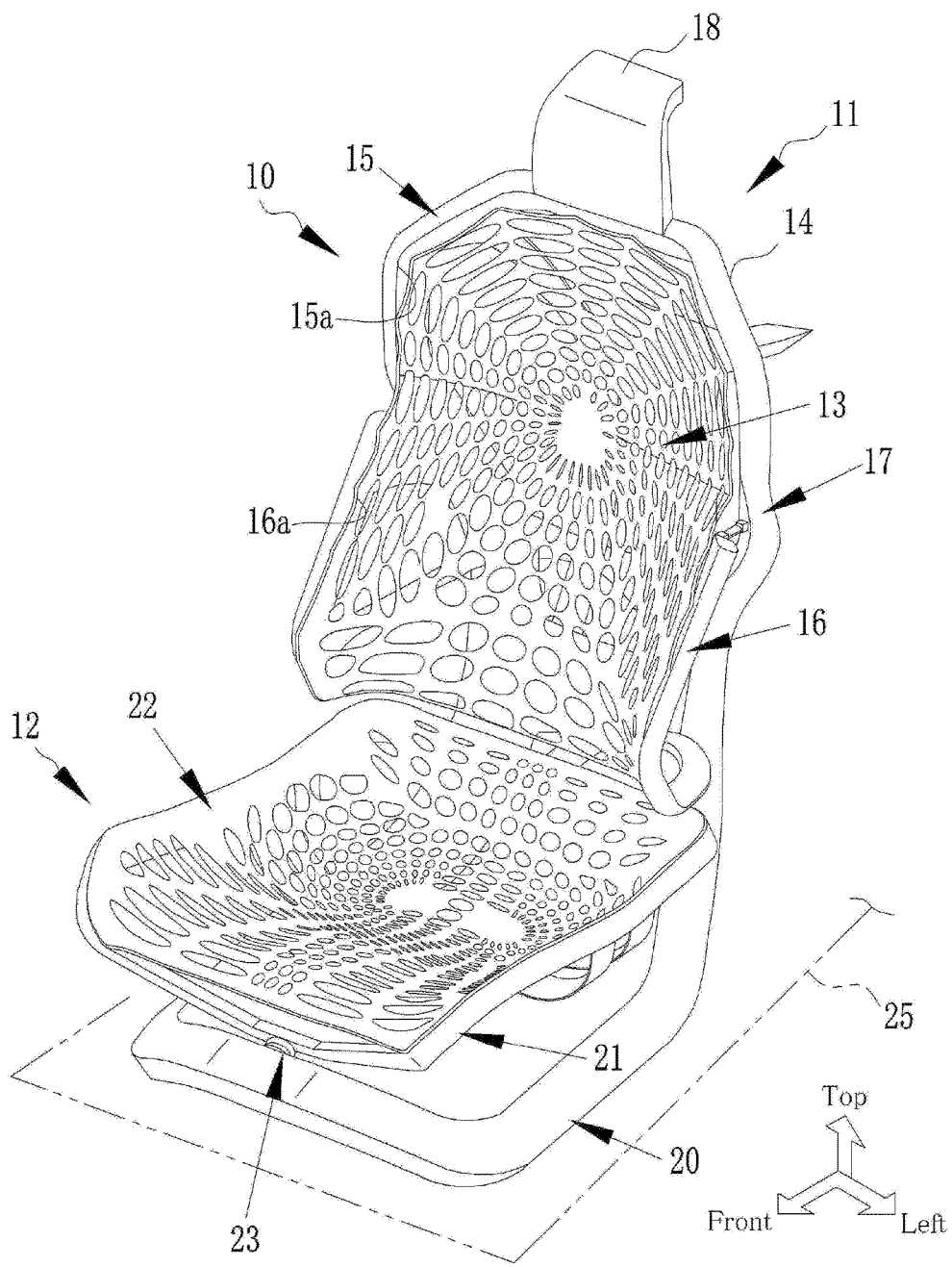
FIG. 1 is a perspective view showing the vehicle seat according to at least one embodiment of the present disclosure.

Example embodiments of the present application will now be explained with reference to the accompanying drawings. Turning now to FIG. 1, there is shown a structure of a vehicle seat 10 according to at least one embodiment of the present application. The vehicle seat 10 is used in some embodiments not only as a driver's seat but also as a passenger's seat, e.g., a front passenger seat.

The vehicle seat 10 comprises a seatback section 11 for supporting a back of an occupant, and a seat base section 12 for supporting a thigh and hip area of the occupant. The seatback section 11 comprises a seatback frame 14 as an upper portion of a main frame 15 contoured along the back of the occupant, a sub-frame 16 suspended from the seatback frame 14, and a backrest 13 attached to the seatback frame 14 and the sub-frame 16. As illustrate in FIG. 1, the main frame 15 is shaped into an L-shape comprising the seatback frame 14 erected substantially vertically, and a pedestal frame 20 extending horizontally from a lower end of the seatback frame 14 toward the front side. Specifically, the sub-frame 16 is suspended from an intermediate portion of the seatback frame 14 through a swiveling mechanism 17. An upper portion of the backrest 13 is attached to the seatback frame 14 along an inner edge 15a of the main frame 15, and a lower portion of the backrest 13 is attached to the sub-frame 16 along an inner edge 16a of the sub-frame 16. Since the sub-frame 16 is suspended from the seatback frame 14 through the swiveling mechanism 17, the sub-frame 16 is allowed to swivel in accordance with a twisting or swiveling motion of a lumbosacral area of the occupant. For this reason, the occupant is allowed to move his/her lumbosacral area easily, and to turn the steering wheel easily. In order to support a head of the occupant, a headrest 18 for is attached to an upper lateral portion of the seatback frame 14.

The seat base section 12 comprises the pedestal frame 20 disposed on a floor of a cabin 25, a rectangular seat base frame 21 situated above the pedestal frame 20, a seat base 22, and a first joint 23. For example, the seat base 22 includes a net formed by drawing a plurality of strings within the seat base frame 21, and a flexible sheet member attached to the net from above.

Optionally, a recliner mechanism (not shown) may be arranged between the seatback frame 14 and the pedestal frame 20 to adjust an inclination of the seatback frame 14 in accordance with preferences of the occupant. In addition, the vehicle seat 10 may be mounted on a rail arranged on the floor of the cabin 25 to adjust a longitudinal position of the vehicle seat 10.

Figure 2:
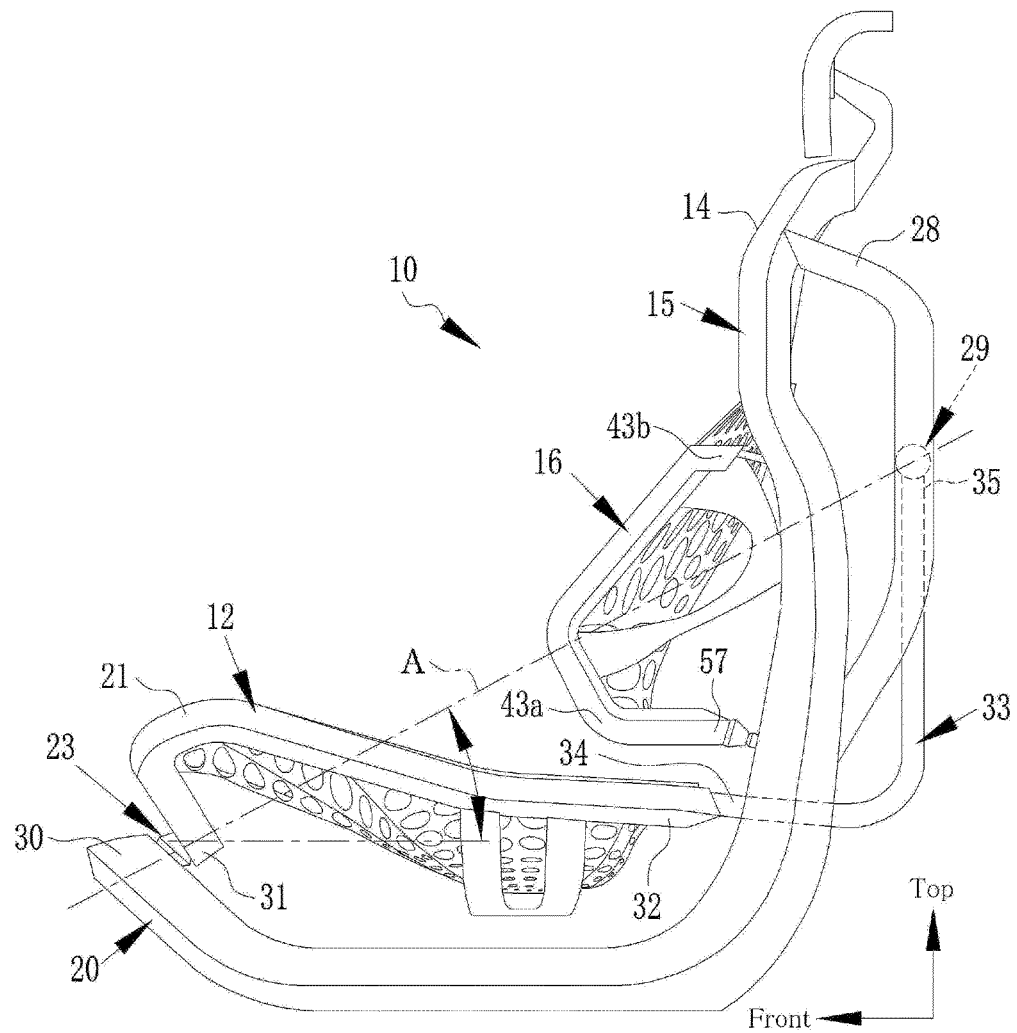
FIG. 2 is a side view showing a right side of the vehicle seat shown in FIG. 1.

FIG. 2 shows a side view of the vehicle seat 10. A front center 31 of the seat base frame 21 is connected to a front center 30 of the pedestal frame 20 in a pivotal manner through the first joint 23 such as a ball joint.

A rear center 32 of the seat base frame 21 is connected to the seatback frame 14 through a pivot shaft 33 and a rear support 28 attached to the seatback frame 14 from behind. Specifically, one end 34 of the pivot shaft 33 is connected to the rear center 32 of the seat base frame 21, and other end 35 of the pivot shaft 33 is connected to an intermediate portion of the rear support 28 in a pivotal manner through a second joint 29 such as a ball joint.

Specifically, the first joint 23 is fixed at a level that a virtual axis A connecting the first joint 23 and the second joint 29 passes through a lumbosacral area of e.g., an AM50 dummy defined by the NHTSA (i.e., the occupant). Preferably, an inclination of the virtual axis A is set to 60 degrees, and may be adjusted within a range between 45 degrees and 75 degrees. In the vehicle seat 10, therefore, the seat base frame 21 is allowed to pivot around the virtual axis A during turning of the vehicle with a twisting motion or a swiveling motion of the lumbosacral area of the occupant. For this reason, the occupant may be held comfortably by the vehicle seat 10 while being allowed to move his/her lumbosacral area.

Thus, the vehicle seat 10 is provided with a pivot mechanism including the first joint 23 and the second joint 29 for supporting the pelvis periphery of the occupant in a pivotal manner during turning. For this reason, the vehicle seat 10 may comfortably hold the occupant with a movement of the occupant, and such pivot mechanism may be manufactured at a reasonable cost.

Figure 3:
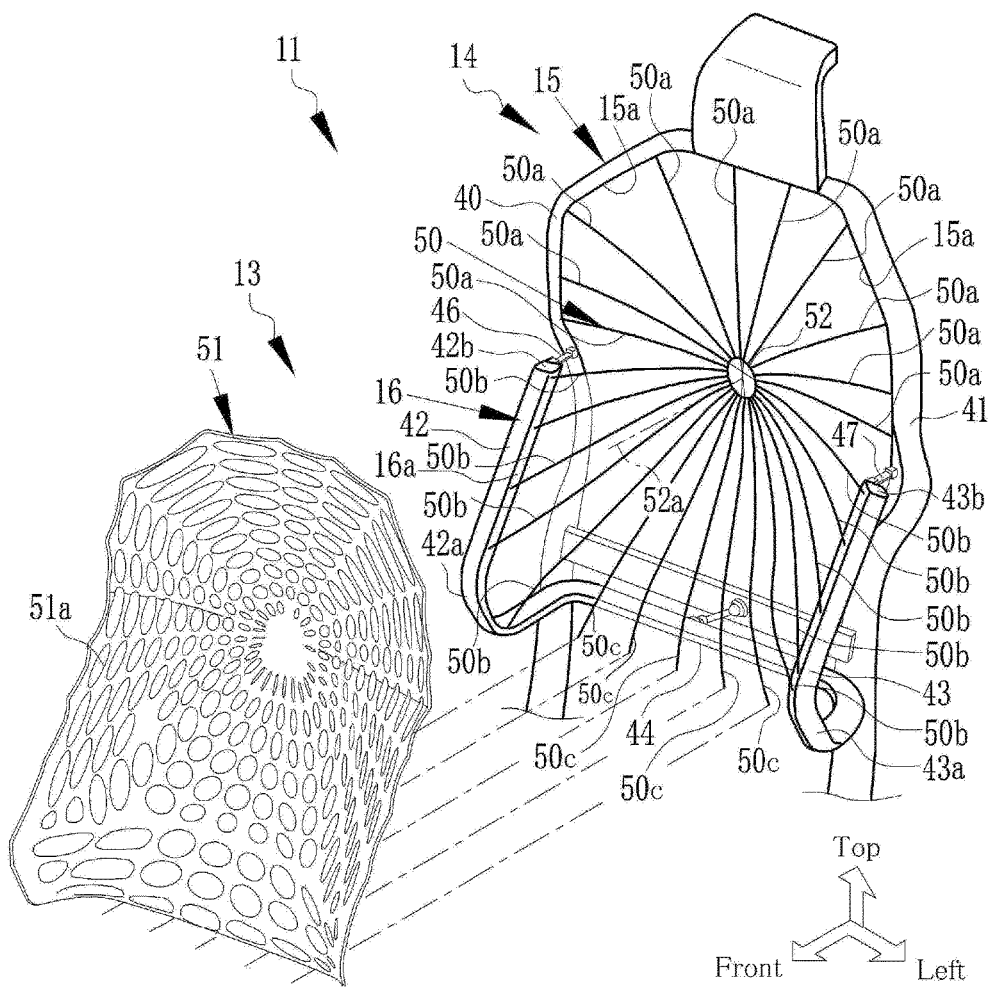
FIG. 3 is an exploded perspective view showing parts of the seatback section according to at least one embodiment of the present disclosure.

A structure of the seatback section 11 is shown in FIG. 3 in more detail. The seatback frame 14 comprises a right vertical portion 40 and a left vertical portion 41, and the sub-frame 16 comprises a right longitudinal portion 42, a left longitudinal portion 43 and a lower lateral portion 44.

In the sub-frame 16, a right upper end 42b of the right longitudinal portion 42 is connected to the intermediate portion of the right vertical portion 40 of the seatback frame 14 through a first elastic member 46, and the right longitudinal portion 42 extends downwardly while being inclined slightly frontward. A left upper end 43b of the left longitudinal portion 43 is connected to the intermediate portion of the left vertical portion 41 of the seatback frame 14 through a second elastic member 47, and the left longitudinal portion 43 extends downwardly while being inclined slightly frontward. The lower lateral portion 44 as a reinforcement member extends between a right lower end 42a of the right longitudinal portion 42 and a left lower end 43a of the left longitudinal portion 43 while being withdrawn backwardly to enhance torsional rigidity of the sub-frame 16. Thus, the sub-frame 16 has a symmetrical U-shape.

In the backrest 13, a plurality of stretchable flexible strings 50 are drawn radially within the upper portion of the seatback frame 14 and the sub-frame 16 to form a net, and a flexible sheet member 51 is attached to the net from the front side. In the net, a hub ring 52 is situated at a point corresponding to the spine of the occupant between shoulder blades. Specifically, in a first group of the strings 50, the strings 50a are drawn between the hub ring 52 and the inner edge 15a of the main frame 15. In a second group of the strings 50, the strings 50b are drawn between the hub ring 52 and the inner edge 16a of the sub-frame 16. In a third group of the strings 50, the strings 50c are drawn between the hub ring 52 and a lower edge of the sheet member 51.

For example, a position of the hub ring 52 may be fixed by one of the strings 50a drawn vertically, a pair of strings 50a drawn horizontally in both sides of the hub ring 52, and one of the strings 50c drawn vertically. In order to fix the position of the hub ring 52 stably, string material having higher tensile strength then the other strings may be used as the above-explained four strings.

Outer end portions and inner end portions of the strings 50 may be attached individually to the seatback frame 14, the sub-frame 16 and the sheet member 51 through a stopper member or the like. Instead, through holes for letting through the strings 50 may also be formed on the seatback frame 14, the sub-frame 16 and the sheet member 51. In this case, each of the strings 50 is passed through the through hole, and returned from the hub ring 52 to be passed through the adjacent through hole. An end portion of the string 50 coming out of the adjacent through hole is joined to the other end portion.

Thus, the sub-frame 16 is suspended from the seatback frame 14 not only through the first elastic member 46 and the second elastic member 47 but also through the strings 50 while being allowed to swivel around the hub ring 52 in accordance with a twisting motion of the lumbosacral area of the occupant. In order to achieve a required tensile strength of the net, number of the string 50 may be altered. Instead, belt members individually having a predetermined width may also be used to form the net.

The sheet member 51 comprises a plurality of holes 51a formed in predetermined geometric patterns, and a plurality of fitting grooves (not shown) formed on a rear face of the sheet member 51 along the strings 50. The sheet member 51 is attached to the net from the front side by fitting each of the strings 50 into the fitting groove. For example, the sheet member 51 may be formed of elastic material having predetermined tensile strength such as thermoplastic elastomer or thermoplastic polyether-polyester-elastomer by an injection method. Optionally, the sheet member 51 may also be formed of two layers having different tensile strength. In addition, one or more annular string(s) may be drawn around the hub ring 52 to expedite rotational motions of the net and the sheet member 51 around the hub ring 52.

Figure 4:
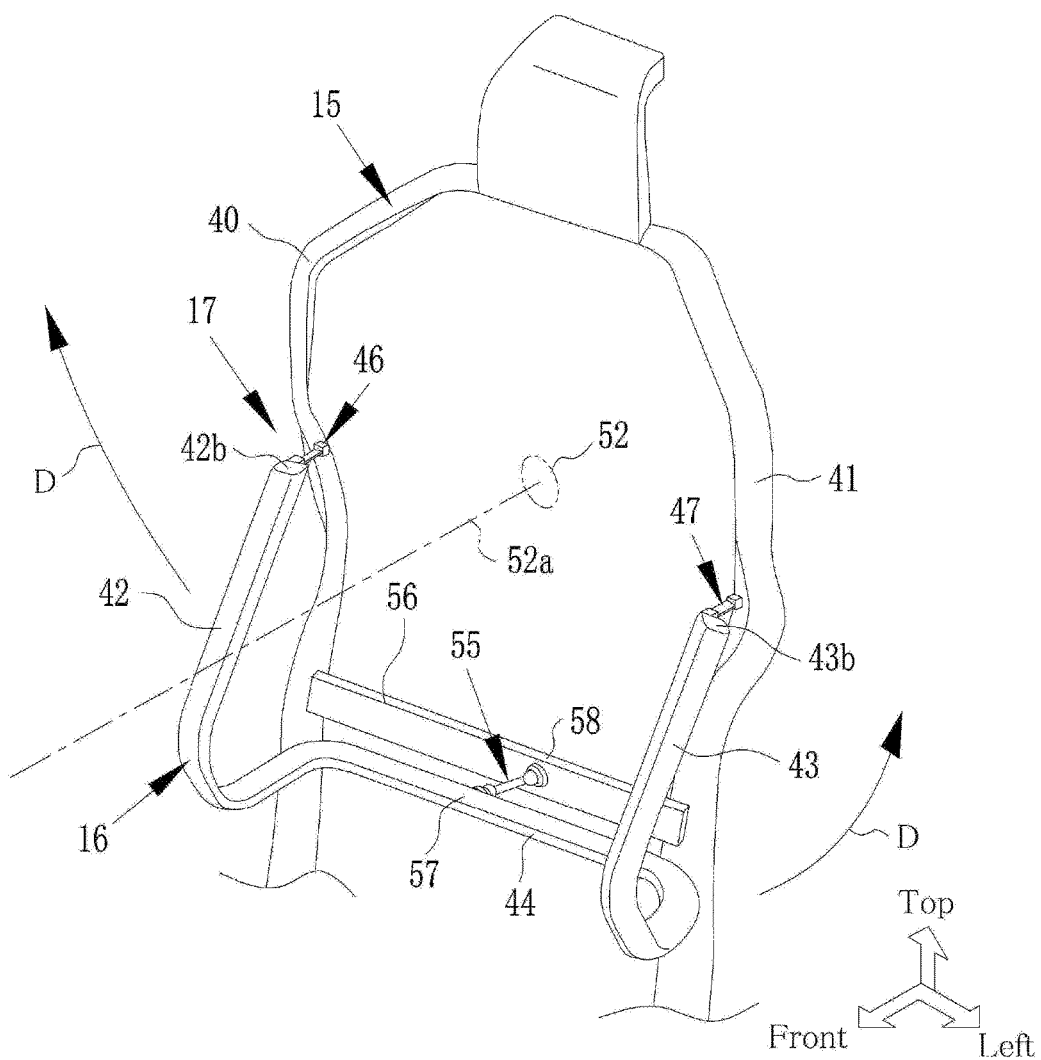
FIG. 4 is a perspective view showing a structure of the sub-frame.

Turning to FIG. 4, there is shown a structure of the swiveling mechanism 17. The swiveling mechanism 17 comprises the first elastic member 46, the second elastic member 47 and a universal joint mechanism 55. The first elastic member 46 and the second elastic member 47 are bent by a rotational torque applied to the sub-frame 16 to allow the sub-frame 16 to swivel in a direction D while restricting a swiveling range within a predetermined range. In addition, the first elastic member 46 and the second elastic member 47 absorb a load applied to the sub-frame 16 in an anteroposterior direction from the back of the occupant. When the rotational torque is eliminated, the sub-frame 16 is returned elastically to an original center position by the first elastic member 46 and the second elastic member 47.

As described, in the sub-frame 16, the right upper end 42b of the right longitudinal portion 42 is connected to the intermediate portion of the right vertical portion 40 of the seatback frame 14 through the first elastic member 46, and the left upper end 43b of the left longitudinal portion 43 is connected to the intermediate portion of the left vertical portion 41 of the seatback frame 14 through the second elastic member 47. Specifically, the first elastic member 46 and the second elastic member 47 are situated at a substantially same level as the axis 52a of the hub ring 52. Here, the right upper end 42b and the left upper end 43b may be situated slightly above the first elastic member 46 and the second elastic member 47.

A lateral member 56 extends between the right vertical portion 40 of the seatback frame 14 and the left vertical portion 41 of the seatback frame 14 at a level of the lower lateral portion 44 of the sub-frame 16, and the universal joint mechanism 55 connects a width center 57 of the lower lateral portion 44 of the sub-frame 16 to a width center 58 of the lateral member 56.

Figure 5:
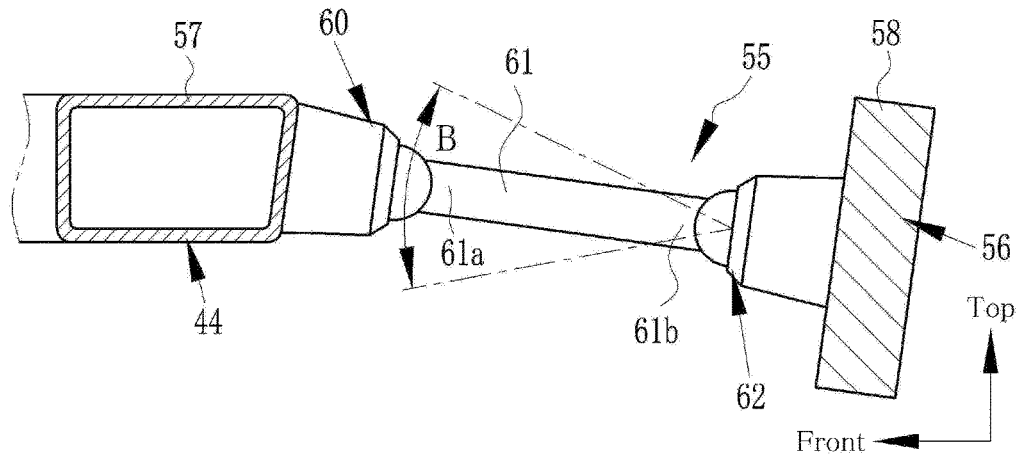
FIG. 5 is a side view showing a structure of a universal joint.

A structure of the universal joint mechanism 55 is shown in FIG. 5 in more detail. The universal joint mechanism 55 comprises a first joint 60 attached to the width center 57 of the lower lateral portion 44 of the sub-frame 16, a second joint 62 attached to the width center 58 of the lateral member 56, and an arm 61 extending in an anteroposterior direction between the first joint 60 and the second joint 62. That is, an end portion 61a of the arm 61 connected to the first joint 60 is allowed to pivot about the first joint 60, and other end 61b of the arm 61 connected to the second joint 62 are allowed to pivot about the second joint 62. According to the embodiments of the present disclosure, a pivotal range of the second joint 62 is restricted within a predetermined pivotal range B, e.g., within 30 degrees. Since the second joint 62 is attached to the width center 58 of the lateral member 56 as a stationary member that is fixed to the main frame 15, the arm 61 is pivoted universally about the second joint 62 within the pivotal range B in accordance with a swiveling motion of the sub-frame 16. In the seatback section 11, therefore, the sub-frame 16 is allowed to swivel while maintaining a distance between the lower lateral portion 44 and the lateral member 56 in an amount of length of the universal joint mechanism 55. In this situation, the universal joint mechanism 55 receives a load applied to the sub-frame 16 in an anteroposterior direction from the lumbosacral area of the occupant to prevent a swing motion of the sub-frame 16 in the anteroposterior direction. For example, a ball joint may be employed as the first joint 60 and the second joint 62. Optionally, the first joint 60 may be situated at a level slightly higher than the second joint 62.

Figure 6:
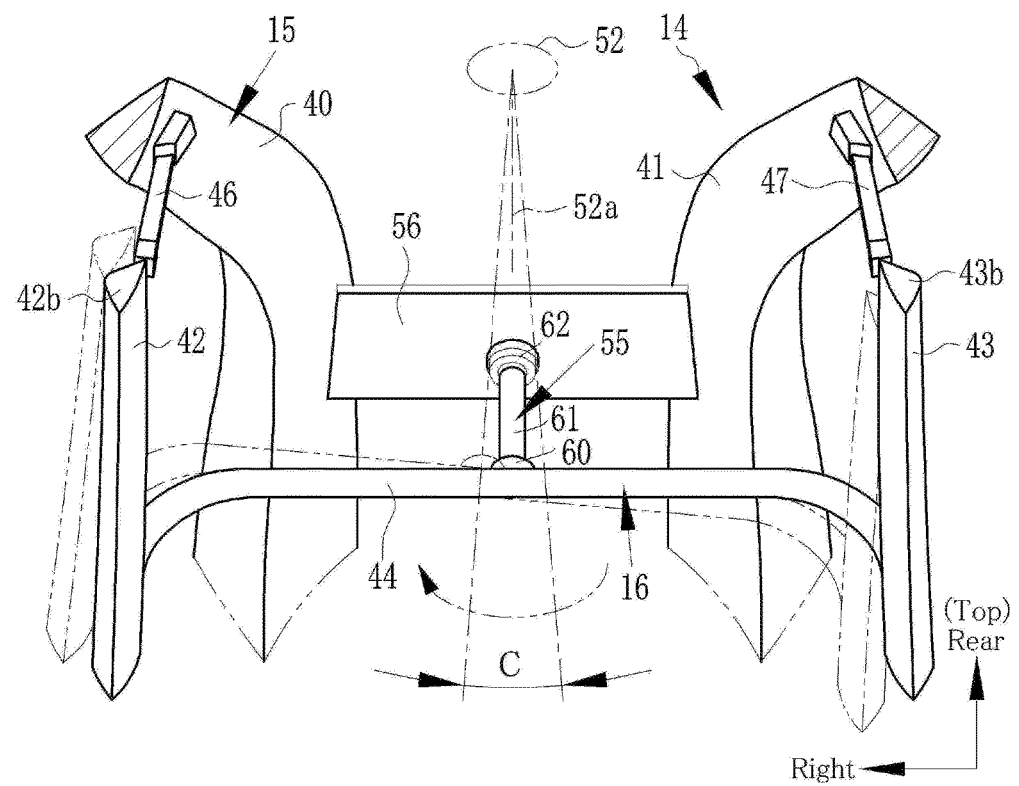
FIG. 6 is a top front view of the sub-frame.

FIG. 6 is a top view of the sub-frame 16. As described, in the sub-frame 16, the right upper end 42b of the right longitudinal portion 42 and the left upper end 43b of the left longitudinal portion 43 are situated at a substantially same level as the hub ring 52 or slightly lower than the hub ring 52. As shown in FIG. 6, specifically, a pivotal range of the lower lateral portion 44 of the sub-frame 16 about the second joint 62 of the universal joint mechanism 55 is restricted within a pivotal range C governed by the pivotal range B of the second joint 62 and a length of the arm 61 of the universal joint mechanism 55.

Figure 7:
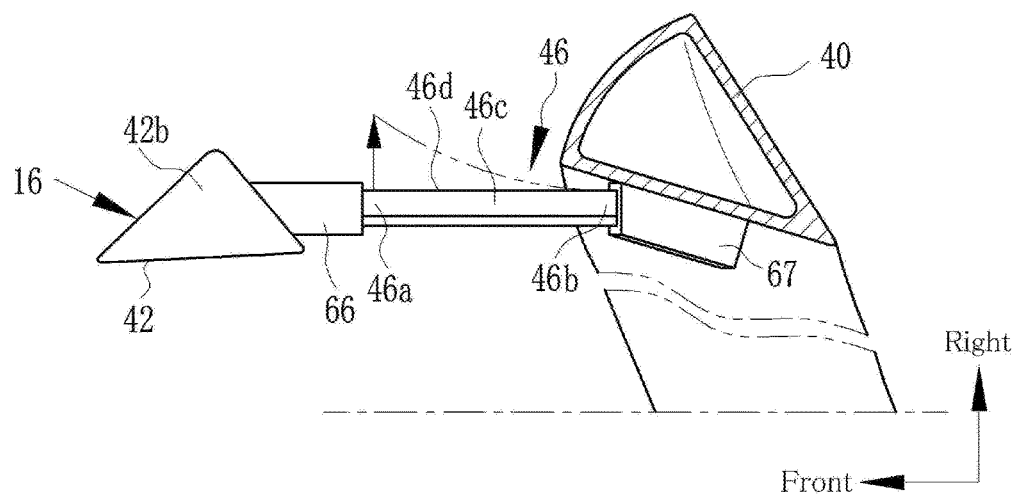
FIG. 7 is a top view showing a first elastic member.

FIG. 7 is a top view of the first elastic member 46. According to the embodiments of the present disclosure, a rectangular parallelepiped blade spring is used as the first elastic member 46. A front end 46a of the first elastic member 46 is held in a front spring holder 66 attached to the right upper end 42b of the right longitudinal portion 42 of the sub-frame 16, and a rear end 46b is held in a rear spring holder 66 attached to the intermediate portion of the right vertical portion 40 of the seatback frame 14. In the first elastic member 46, a rectangular major face 46c extends in a longitudinal direction of the vehicle seat 10, and the first elastic member 46 is inclined at a predetermined angle in such a manner that a lower long side 46d of the major face 46c is situated outer side than an upper long side 46d of the major face 46c in the width direction of the vehicle seat 10. That is, the first elastic member 46 is inclined in such a manner as to be bent easily by a swiveling motion of the right upper end 42b of the right longitudinal portion 42 of the sub-frame 16 in a rotational direction of the sub-frame 16 around the axis 52a of the hub ring 52 as indicated by an arrow and a dashed-dotted curve. The second elastic member 47 is situated at a same level as the first elastic member 46 symmetrically with respect to the first elastic member 46.

For example, when the sub-frame 16 is rotated to the right, the first elastic member 46 and the second elastic member 47 are bent to the right by such swiveling motion of the sub-frame 16. Configuration, material, position etc. of each of the first elastic member 46 and the second elastic member 47 may be altered to restrict a swiveling range of the sub-frame 16 within a desired range. Here, the rotational torque applied to the sub-frame 16 through the universal joint mechanism 55 is governed by a product of a force applied to the sub-frame 16 and a distance between the universal joint mechanism 55 and a point at which the force is applied.

Figure 8:
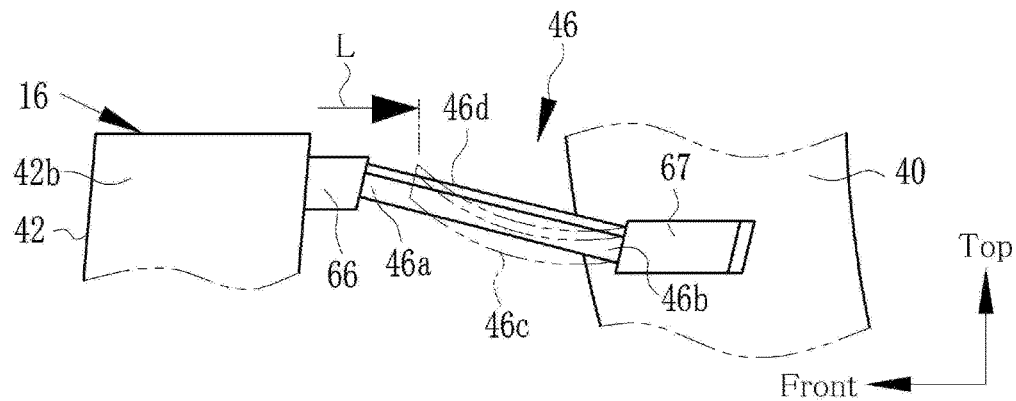
FIG. 8 is a side view showing a right side of the first elastic member.

FIG. 8 is a side view of the first elastic member 46. As illustrated in FIG. 8, when the first elastic member 46 is subjected to a load L from the front side, the first elastic member 46 is elastically buckled to absorb the load L as depicted by the dashed dotted lines. The front end 46a and the rear end 46b of the first elastic member 46 may be situated at a same level. Instead, the rear end 46b may be situated at a level slightly higher than the front end 46a. In this situation, since the second elastic member 47 is arranged symmetrically with respect to the first elastic member 46, the second elastic member 47 is also buckled as the first elastic member 46.

Figure 9:
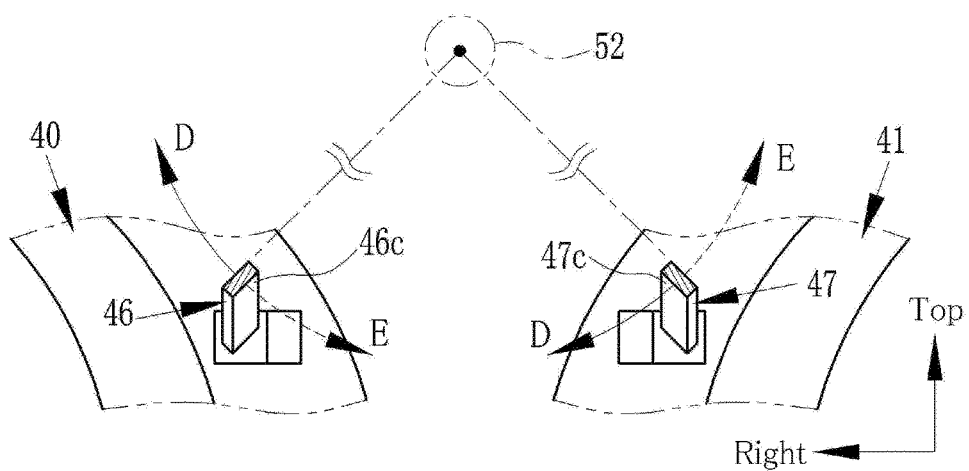
FIG. 9 is a partial front view showing an arrangement of the first elastic member and the second elastic member.

An arrangement of the first elastic member 46 and the second elastic member 47 is shown in FIG. 9 in more detail. As described, the first elastic member 46 and the second elastic member 47 are situated at the same level, and the first elastic member 46 and the second elastic member 47 are inclined in a symmetrical manner. That is, a pivotal range of the sub-frame 16 about the first joint 60 the universal joint mechanism 55 is restricted by the first elastic member 46 and the second elastic member 47. Specifically, the first elastic member 46 and the second elastic member 47 are inclined in such a manner that a distance between the inner major face 46c of the first elastic member 46 and the inner major face 47c of the second elastic member 47 is increased toward the lower side. In other words, the inner major face 46c of the first elastic member 46 and the inner major face 47c of the second elastic member 47 are inclined downwardly toward the universal joint mechanism 55 as a pivot point of the sub-frame 16 situated at lower level than the first elastic member 46 and the second elastic member 47. That is, the first elastic member 46 is allowed to be bent in a direction of a normal line with respect to the inner major face 46c, and the second elastic member 47 is allowed to be bent in a direction of a normal line with respect to the inner major face 47c. For example, when the rotational torque is applied to the sub-frame 16 clockwise to swivel the sub-frame 16 to the right in FIG. 9, the first elastic member 46 and the second elastic member 47 are bent easily in a direction D to allow the swiveling motion of the sub-frame 16, but the swiveling range of the sub-frame 16 is restricted to the lengths of the first elastic member 46 and the second elastic member 47.

When the clockwise rotational torque applied to the sub-frame 16 is eliminated, the sub-frame 16 is returned elastically to the original center position by reaction forces of the first elastic member 46 and the second elastic member 47 acting in a direction E. Thus, the first elastic member 46 and the second elastic member 47 are adapted not only to restrict the swiveling range of the sub-frame 16 but also to return the sub-frame 16 to the center portion.

As described, the swiveling range C of the sub-frame 16 may be adjusted to a desired range depending on e.g., a body weight of the occupant by alerting inclinations, spring rates etc. of the first elastic member 46 and the second elastic member 47.

Optionally, the right longitudinal portion 42 of the sub-frame 16 may also be connected to the right vertical portion 40 of the seatback frame 14 through a plurality of the first elastic member 46. Likewise, the left longitudinal portion 43 of the sub-frame 16 may also be connected to the left vertical portion 41 of the seatback frame 14 through a plurality of the second elastic member 47. In addition, each of the first elastic member 46 and the second elastic member 47 may also be formed individually of a plurality of layers of the blade springs. Further, an arcuate blade spring may also be used as the first elastic member 46 and the second elastic member 47.

Figure 10:
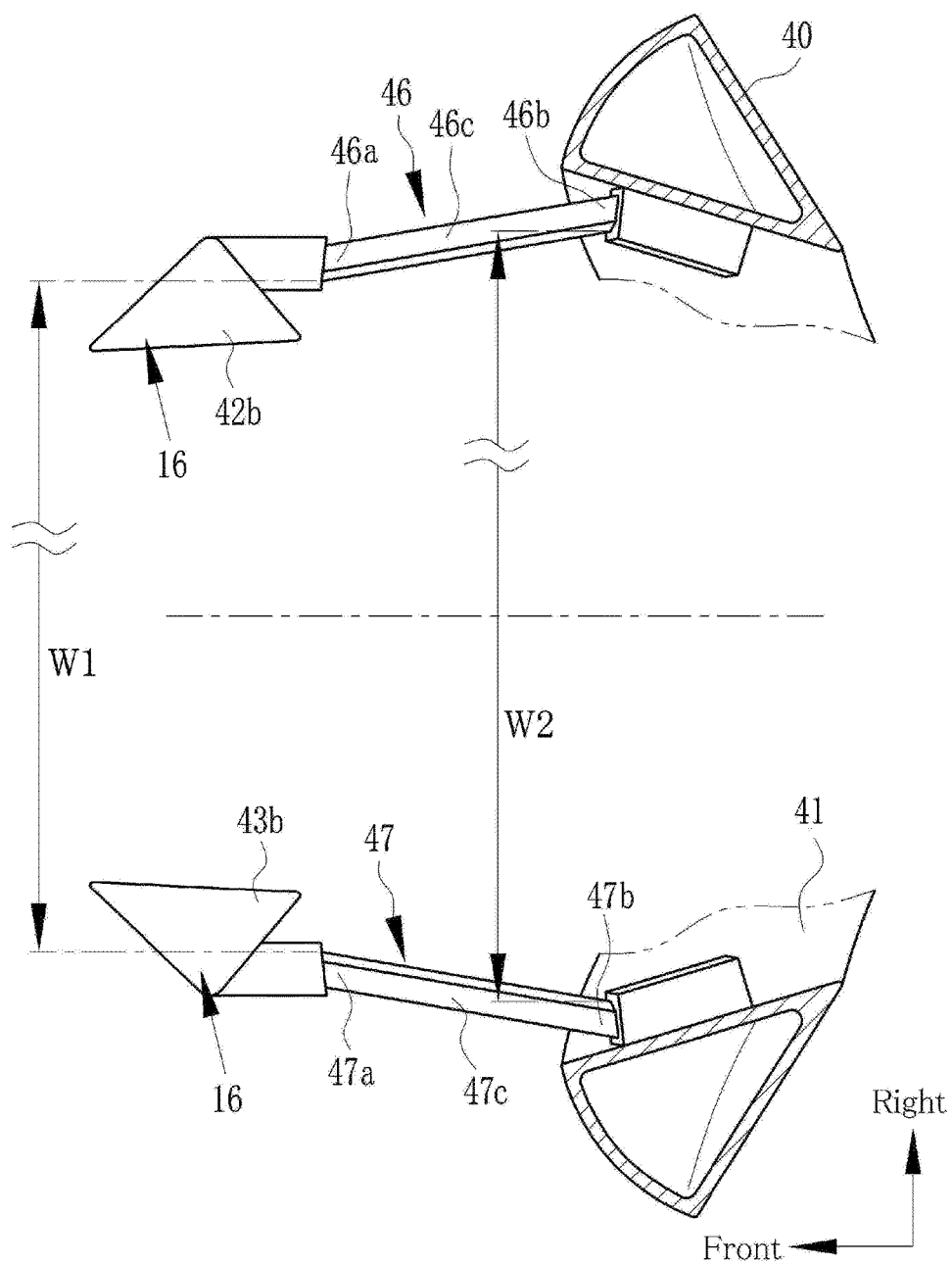
FIG. 10 is a top view showing another arrangement of the first elastic member and the second elastic member.

Turning to FIG. 10, there is shown another embodiment of the present disclosure. According to another embodiment, as illustrated in FIG. 10, the first elastic member 46 and the second elastic member 47 are arranged in such a manner that a clearance W1 between the front end 46a of the first elastic member 46 and a front end 47a of the second elastic member 47 is narrower than a clearance W2 between the rear end 46b of the first elastic member 46 and a rear end 47b of the second elastic member 47. According to another embodiment, therefore, deformations of the first elastic member 46 and the second elastic member 47 may be reduced. That is, it is difficult for the sub-frame 16 to swivel e.g., during turning of the vehicle. By contrast, the sub-frame 16 may be allowed to swivel easier by arranging the first elastic member 46 and the second elastic member 47 in such a manner that the clearance W1 is wider than the clearance W2.

Figure 11:
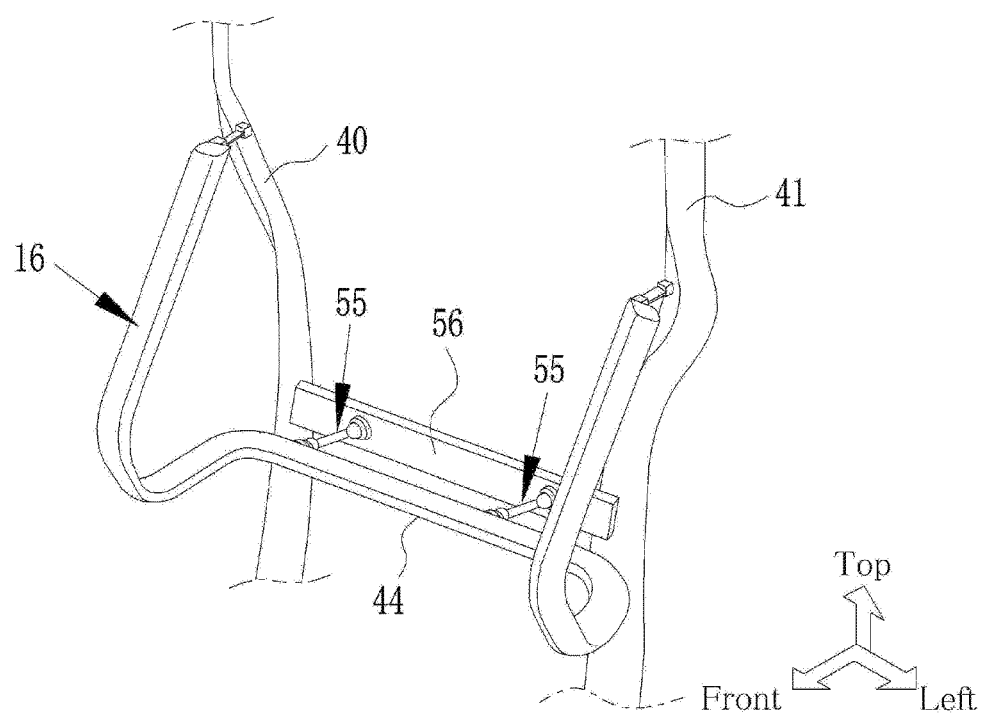
FIG. 11 is a partial perspective view showing an example of arranging a plurality of universal joints.

Turning to FIG. 11, there is shown still another embodiment of the present disclosure. According to still another embodiment, the lateral member 56 attached to the seatback frame 14 is connected to the lower lateral portion 44 of the sub-frame 16 through a pair of the universal joint mechanisms 55. Specifically, the universal joint mechanisms 55 are interposed between the lateral member 56 of the seatback frame 14 and the lower lateral portion 44 of the sub-frame 16 at symmetrical points on both sides of the width center of e.g., the lateral member 56. According to still another embodiment, therefore, rigidity of the universal joint against the load applied to the sub-frame 16 in an anteroposterior direction may be enhanced. In order to further enhance such rigidity against the load in an anteroposterior direction, three or more universal joint mechanisms 55 may be arranged between the lateral member 56 of the seatback frame 14 and the lower lateral portion 44 of the sub-frame 16.

Although the above exemplary embodiments of the present invention have been described, it will be understood by those skilled in the art that the present disclosure should not be limited to the described exemplary embodiments, but that various changes and modifications can be made within the spirit and scope of the present invention.

What is claimed is:

1. A vehicle seat, comprising:
   a main frame including a seatback frame contoured along a back of an occupant; and
   a sub-frame suspended from a front face of the seat back frame through a plurality of strings while being allowed to swivel in accordance with a twisting motion of a lumbosacral area of the occupant;
   wherein the sub-frame includes a right longitudinal portion, a left longitudinal portion, and a lower lateral portion extending between the right longitudinal portion and the left longitudinal portion,
   the vehicle seat further comprising:

a first elastic member that connects a right upper end of the right longitudinal portion of the sub-frame to the seat back frame;

a second elastic member that connects a left upper end of the left longitudinal portion of the sub-frame to the seat back frame; and a universal joint mechanism that connects the lower lateral portion of the sub-frame to a lateral member of the seat back frame, wherein the first elastic member and the second elastic member are adapted to be elastically bent by the twisting motion of the lumbosacral area of the occupant to allow the sub-frame to swivel, and wherein the universal joint mechanism is adapted to allow the sub-frame to swivel while receiving a load applied to the sub-frame in an anteroposterior direction.

2. The vehicle seat as claimed in claim 1, wherein the first elastic member and the second elastic member include a blade spring, and wherein the first elastic member and the second elastic member are inclined symmetrically in such a manner that a distance between an inner major face of the first elastic member and an inner major face of the second elastic member is increased toward the lower side.

3. The vehicle seat as claimed in claim 2, wherein the universal joint mechanism includes:

a first joint attached to the lower lateral portion of the sub-frame, a second joint attached to the lateral member of the seat back frame, and an arm extending in the anteroposterior direction between the first joint and the second joint.

4. The vehicle seat as claimed in claim 3, wherein the first joint and the second joint include a ball joint.

5. The vehicle seat as claimed in claim 1, wherein the universal joint mechanism includes:

a first joint attached to the lower lateral portion of the sub-frame, a second joint attached to the lateral member of the seat back frame, and an arm extending in the anteroposterior direction between the first joint and the second joint.

6. The vehicle seat as claimed in claim 5, wherein the first joint and the second joint include a ball joint.

* * * * *